US010086938B2

(12) United States Patent
Duesterhoft et al.

(10) Patent No.: US 10,086,938 B2
(45) Date of Patent: Oct. 2, 2018

(54) SYSTEMS AND METHODS FOR DRONE MARKING OF AIRBORNE MATERIALS

(71) Applicant: Elwha LLC, Bellevue, WA (US)

(72) Inventors: Paul Duesterhoft, Grapevine, TX (US); William David Duncan, Mill Creek, WA (US); Roderick A. Hyde, Redmond, WA (US); Jordin T. Kare, San Jose, CA (US); Eric C. Leuthardt, St. Louis, MO (US); Tony S. Pan, Bellevue, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 360 days.

(21) Appl. No.: 14/745,989

(22) Filed: Jun. 22, 2015

(65) Prior Publication Data

US 2016/0368604 A1    Dec. 22, 2016

(51) Int. Cl.
*B64D 1/02*    (2006.01)
*B64C 39/02*    (2006.01)

(52) U.S. Cl.
CPC .............. *B64D 1/02* (2013.01); *B64C 39/024* (2013.01); *B64C 2201/12* (2013.01); *B64C 2201/146* (2013.01)

(58) Field of Classification Search
CPC .......... B64D 1/02; B64D 1/00; B64C 39/024; B64C 2201/12; B64C 2201/125; B64C 2201/146; G01N 1/2273; G01N 2001/2279; B64B 1/40
See application file for complete search history.

(56) References Cited

U.S. PATENT DOCUMENTS

| 3,077,779 | A | * | 2/1963 | Froehlich | G01N 1/2273 73/170.28 |
| 4,226,115 | A | * | 10/1980 | Williams | G01N 1/2273 340/12.5 |
| 4,995,572 | A | * | 2/1991 | Piasecki | B64C 37/02 244/140 |

(Continued)

OTHER PUBLICATIONS

Straw, Joseph, "FAA says New York, five other states chosen to host drone test sites," New York Daily News, http://www.nydailynews.com/news/politics/6-states-chosen-drone-test-sites-article-1.1561480, Dec. 30, 2013, date visited Jun. 23, 2015.

(Continued)

*Primary Examiner* — Magdalena Topolski (57) ABSTRACT

An unmanned aerial vehicle may be used to mark airborne material in a plume. The unmanned aerial vehicle may store a macroscopic and/or microscopic tracer material. A sensor and/or control unit may detect a substance of interest in a plume. The sensor may be configured to detect multiple different substances sharing a particular characteristic. The unmanned aerial vehicle may be piloted along a gradient of increasing concentration of the substance of interest. The tracer material may be ejected into the plume. The tracer material may be configured to react and/or interact with the substance of interest. The unmanned aerial vehicle may be piloted a predetermined distance from the plume after the tracer material has been ejected. Additional and/or different tracer material may be ejected into the plume if it is determined from measurements that ejecting additional tracer material would be beneficial.

37 Claims, 6 Drawing Sheets

(56) References Cited

U.S. PATENT DOCUMENTS

| | | | | |
|---|---|---|---|---|
| 5,340,025 | A * | 8/1994 | Pearce | A01M 7/0089 137/78.1 |
| 6,066,295 | A * | 5/2000 | Bernstein | G01V 8/00 250/340 |
| 7,073,748 | B2 * | 7/2006 | Maurer | B64C 39/024 209/143 |
| 7,319,039 | B2 | 1/2008 | Sullivan | |
| 7,341,224 | B1 * | 3/2008 | Osann, Jr. | B64C 39/028 244/30 |
| 7,679,563 | B2 | 3/2010 | Werner et al. | |
| 7,684,043 | B2 | 3/2010 | Dorvee et al. | |
| 7,811,520 | B2 * | 10/2010 | Bernhardt | G01N 1/2226 422/400 |
| 7,840,380 | B2 | 11/2010 | Bernhardt | |
| 7,985,590 | B2 | 7/2011 | McNeil | |
| 8,153,435 | B1 | 4/2012 | Fraser | |
| 8,501,481 | B1 | 8/2013 | Fraser | |
| 8,820,672 | B2 * | 9/2014 | Erben | B64C 39/024 244/1 R |
| 9,255,775 | B1 * | 2/2016 | Rubin | F42B 12/36 |
| 9,481,460 | B1 * | 11/2016 | Kozloski | B64C 39/024 |
| 2003/0066932 | A1 * | 4/2003 | Carroll | B64C 39/024 244/120 |
| 2004/0189976 | A1 * | 9/2004 | Burns | G01N 1/26 356/28.5 |
| 2005/0080586 | A1 | 4/2005 | Kanevsky et al. | |
| 2006/0262318 | A1 | 11/2006 | Sullivan | |
| 2008/0224947 | A1 | 9/2008 | Werner et al. | |
| 2009/0222207 | A1 | 9/2009 | Bernhardt | |
| 2010/0285490 | A1 * | 11/2010 | Dees | G01N 33/54373 435/7.1 |
| 2010/0304491 | A1 | 12/2010 | McNeil | |
| 2011/0251800 | A1 | 10/2011 | Wilkins | |
| 2012/0268308 | A1 * | 10/2012 | Tuttle | G01S 13/282 342/42 |
| 2013/0176570 | A1 | 7/2013 | Beck et al. | |
| 2013/0208262 | A1 | 8/2013 | Andreussi | |
| 2013/0278427 | A1 * | 10/2013 | Setton | G08B 21/12 340/584 |
| 2014/0011286 | A1 | 1/2014 | Potyrailo | |
| 2014/0057276 | A1 * | 2/2014 | Farquar | C12Q 1/6876 435/6.12 |
| 2016/0288904 | A1 * | 10/2016 | Tanielian | B64C 39/02 |

OTHER PUBLICATIONS

Environmental Protection Agency, "Air Quality Plume Detection and Monitoring Using UAVs and Unmanned Rotorcraft," www.epa.gov/airnow/2010conference/naqc/forecasting/kosmatka_final.pdf Date visited Jun. 23, 2015.

Federal Aviation Administration, "Minimum Safe Altitudes," Code of Federal Regulations Sec. 91.119 http://rgl.faa.gov/regulatory_and_guidance_library/rgfar.nsf/b4a0cab3e513bb58852566c70067018f/91693c93525de33e862576c100763e31!OpenDocument date visited Jun. 23, 2015.

* cited by examiner

```
┌─────────────────────────────────────────────┐
│ Store Tracer Material in Unmanned Aerial Vehicle │
│                    602                           │
└─────────────────────────────────────────────┘
                       ↓
┌─────────────────────────────────────────────┐
│    Detect a Substance of Interest in a Plume    │
│                    604                           │
└─────────────────────────────────────────────┘
                       ↓
┌─────────────────────────────────────────────┐
│  Pilot Vehicle along Gradient of Increasing Concentration │
│                    606                           │
└─────────────────────────────────────────────┘
                       ↓
┌─────────────────────────────────────────────┐
│        Eject Tracer Material into the Plume     │
│                    608                           │
└─────────────────────────────────────────────┘
                       ↓
┌─────────────────────────────────────────────┐
│   Pilot Vehicle Predetermined Distance from the Plume │
│                    610                           │
└─────────────────────────────────────────────┘
                       ↓
┌─────────────────────────────────────────────┐
│ Determine from Measurements Additional Tracer Material Should Be │
│                  Ejected                         │
│                    612                           │
└─────────────────────────────────────────────┘
                       ↓
┌─────────────────────────────────────────────┐
│   Eject Additional Tracer Material into the Plume │
│                    614                           │
└─────────────────────────────────────────────┘
```

SYSTEMS AND METHODS FOR DRONE MARKING OF AIRBORNE MATERIALS

If an Application Data Sheet ("ADS") has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This application relates to systems and methods for marking airborne material using an unmanned aerial vehicle.

SUMMARY

An unmanned aerial vehicle may be configured to trace airborne materials. In some embodiments, the unmanned aerial vehicle may be configured to mark airborne materials in a plume and/or the plume itself. The unmanned aerial vehicle may eject a tracer material to mark the airborne materials and/or to mark the plume. The tracer material may include macroscopic material, microscopic material, and/or the like. The tracer material may be configured to react and/or interact with the airborne material. The tracer material may be configured to change properties after reacting and/or interacting with the airborne material. The tracer material may be stored in the unmanned aerial vehicle, e.g., in a storage bay, a storage tank, etc., and may be ejected using a nozzle, by opening doors, and/or the like.

The unmanned aerial vehicle may detect a substance of interest in a plume prior to ejecting a tracer material. For example, the unmanned aerial vehicle may include a sensor, which may be configured to detect the substance of interest and/or the plume. The sensor may include a mass spectrometer, an optical spectrometer, an image sensor, and/or the like. The unmanned aerial vehicle may include a laser illuminator in some embodiments, and the sensor may be configured to detect reflections of light from the laser illuminator off of a test substance (e.g., a plume potentially containing the substance of interest). The substance of interest may include a pollutant, an explosive-related compound, a radioactive substance, a biological hazard, a toxic chemical, and/or the like.

The unmanned aerial vehicle may be piloted to a determined location where the tracer material is to be ejected. For example, the unmanned aerial vehicle may be piloted along a gradient of increasing concentration, such as a maximum gradient. Alternatively, or in addition, the unmanned aerial vehicle may be piloted a predetermined distance from the plume while the tracer material is being ejected. The unmanned aerial vehicle may be piloted a predetermined distance from the plume and/or tracer material after the tracer material has been ejected. In some instances, the unmanned aerial vehicle may determine that additional tracer material should be ejected and may eject the additional tracer material into the plume.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF PREFERRED EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Plumes of airborne material may be emitted into the atmosphere. A source of the plume may be a home, a vehicle, an industrial site, an explosion, a crop field, and/or the like. The airborne material may pollute the atmosphere, nearby land, etc. The airborne material may be traced to determine who is affected by the airborne material in a particular plume and/or to determine the source of airborne material causing harm. However, the plumes of airborne material may be difficult to trace because the plumes may travel long distances and the airborne material may disperse. Accordingly, there is a need for improved techniques for tracking airborne material.

An unmanned aerial vehicle may be configured to mark airborne material so that it can be more easily tracked. The unmanned aerial vehicle may be a remotely piloted aerial vehicle controlled by a remotely located human pilot, an unpiloted aerial vehicle controlled by a locally or remotely located automatic pilot, and/or the like. The unmanned aerial vehicle may include a tracer storage unit configured to hold a tracer material. The unmanned aerial vehicle may also include a tracer dispenser configured to eject the tracer material into the plume. The unmanned aerial vehicle may include a control unit configured to instruct the tracer dispenser to eject the tracer material.

The control unit may include a processor and may decide whether or not the tracer material should be ejected. Alternatively, a communication interface may be configured to receive an indication of whether or not the tracer material should be ejected, and the control unit may instruct the tracer dispenser based on the indication. The control unit may pilot the unmanned aerial vehicle autonomously and/or may pilot the unmanned aerial vehicle based on instructions received from a remote source. Alternatively, or in addition, the remote instructions may bypass the control unit and be provided directly to flight control surfaces and/or the engine(s).

The tracer material may be configured to drift along with the plume. The tracer material may include macroscopic material (e.g., a plurality of macroscopic objects). The macroscopic material may include mini-balloons. The mini-balloons may be marked with tags that uniquely identify each mini-balloon. The tags may include tags readable using radio frequency signals, tags readable optically, and/or the like. The tracer dispenser may be configured to inflate the mini-balloons upon ejection. For example, the unmanned aerial vehicle may store compressed gas for inflating the mini-balloons and/or may compress ambient gases when it inflates the mini-balloons. In some embodiments, the macroscopic material may include radio frequency retroreflectors, optical retroreflectors, chaff, and/or the like.

The tracer material may also, or instead, include a microscopic material. The microscopic material may include a fluorescent material, such as a fluorescent nanocrystal. The microscopic material may include a smart dust, an aerogel, sulfur hexafluoride, a radioactive substance, and/or the like. The tracer material may be configured to react with a substance of interest in the plume, e.g., by a chemical reaction, absorption, etc. The tracer material may change color, change conductivity, change light scattering properties, and/or the like upon reacting with the substance of interest. The tracer material may be configured to sense a substance of interest in the plume. For example, the properties of the tracer material may change in response to the substance of interest without reacting with the substance of interest, e.g., the substance of interest may be adsorbed onto the surface of the tracer material. In some embodiments, the tracer material may be inert and/or may not react or respond to a substance of interest.

The tracer dispenser may be configured based on the material to be released. For example, if the tracer material includes a microscopic material, the tracer dispenser may include a nozzle for ejecting the microscopic material. Alternatively, or in addition, the tracer dispenser may be configured to release many different types of material. The tracer dispenser may include one or more doors for releasing macroscopic and/or microscopic material from a storage area. Similarly, the tracer storage unit may be configured based on the material to be released and may include a storage tank, a storage bay, and/or the like.

The unmanned aerial vehicle may include a sensor configured to detect a substance of interest in the plume. For example, the sensor may detect the plume by detecting the substance of interest. The control unit may be configured to instruct the tracer dispenser to eject the tracer material in response to detecting the substance of interest. In an embodiment, the control unit may instruct the tracer dispenser to eject the tracer material in response to detecting a concentration of the substance of interest above a predetermined threshold. Alternatively, or in addition, the control unit may be configured to determine a gradient of increasing concentration of the substance of interest based on sensor measurements. The control unit may be configured to pilot the unmanned aerial vehicle along the gradient of increasing concentration prior to instructing the tracer dispenser to eject the tracer material. For example, the control unit may pilot the unmanned aerial vehicle to a likely source of the substance of interest, for a predetermined distance, until a predetermined concentration is reached, and/or the like.

The substance of interest may include one or more of a pollutant, an explosive-related compound, a radioactive substance, a biological hazard, a toxic chemical, a compound used for producing illicit drugs (e.g., methamphetamines, etc.), and/or the like. For example, the sensor may be configured to detect a pollutant, such as methane, carbon dioxide, sulfur dioxide, and/or the like. The sensor may be configured to detect an explosive-related compound, such as a reactant, a combustion product, a binder, and/or the like. The sensor may also, or instead, be configured to detect a radioactive substance, a biological hazard, a toxic chemical, and/or the like.

The sensor may include a spectrometer (e.g., an optical spectrometer, a mass spectrometer, etc.). In an embodiment, the sensor may include a laser illuminator. The laser illuminator may emit light at a target substance. The spectrometer may measure a reflection of the light emitted by the laser illuminator off of the target substance. Alternatively, or in addition, the sensor may include a radiation detector, an image sensor, and/or the like. The unmanned aerial vehicle may include a propeller and/or a jet to produce thrust and/or lift, and the sensor may be positioned downstream of the propeller and/or jet. The large volume of air delivered to the sensor by the propeller and/or jet may increase sensitivity to low concentrations of the substance of interest.

The control unit may instruct the tracer dispenser to eject additional tracer material. For example, the control unit may determine that additional tracer material should be ejected. The control unit may determine that additional tracer material should be ejected based on sensor measurements. For example, the sensor measurements may be measurements of the substance of interest and/or measurements of the tracer material, such as the concentration of the substance of interest and/or the tracer material. Alternatively, or in addition, the control unit may instruct the tracer dispenser to eject the additional tracer material in response to a transceiver receiving an indication from a remote source that additional tracer material should be ejected. The remote source may include a remote pilot, a remote server and/or processor, a remote monitoring site, and/or the like. The additional tracer material may include a same material as the previously ejected tracer material and/or a material different from the previously ejected tracer material.

The control unit may be configured to pilot the unmanned aerial vehicle a predetermined distance from the plume while instructing the tracer dispenser to eject the tracer material. For example, the control unit may pilot the unmanned aerial vehicle close enough to the plume to ensure the tracer material enters the plume. The control unit may be configured to pilot the vehicle a predetermined distance from the tracer material after instructing the tracer dispenser to eject the tracer material. For example, the predetermined distance may be selected to prevent disruption to a natural motion of the tracer material and/or the plume. The unmanned aerial vehicle may be a vehicle piloted by the control unit. Alternatively, or in addition, the unmanned aerial vehicle may be remotely piloted by a human or automatic operator, and the control unit may include autopilot functionalities capable of piloting the vehicle during and/or after dispensing the tracer material. In some embodiments, a remotely located automatic pilot may be configured to pilot the vehicle a predetermined distance from the plume and/or tracer material during and/or after dispensing of the tracer material.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" and/or wireless protocols known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers; computer programming tools and techniques; computer networks and networking technologies; digital storage media; authentication; access control; and other security tools and techniques provided by public keys, encryption, firewalls, and/or other means.

Figure 1:
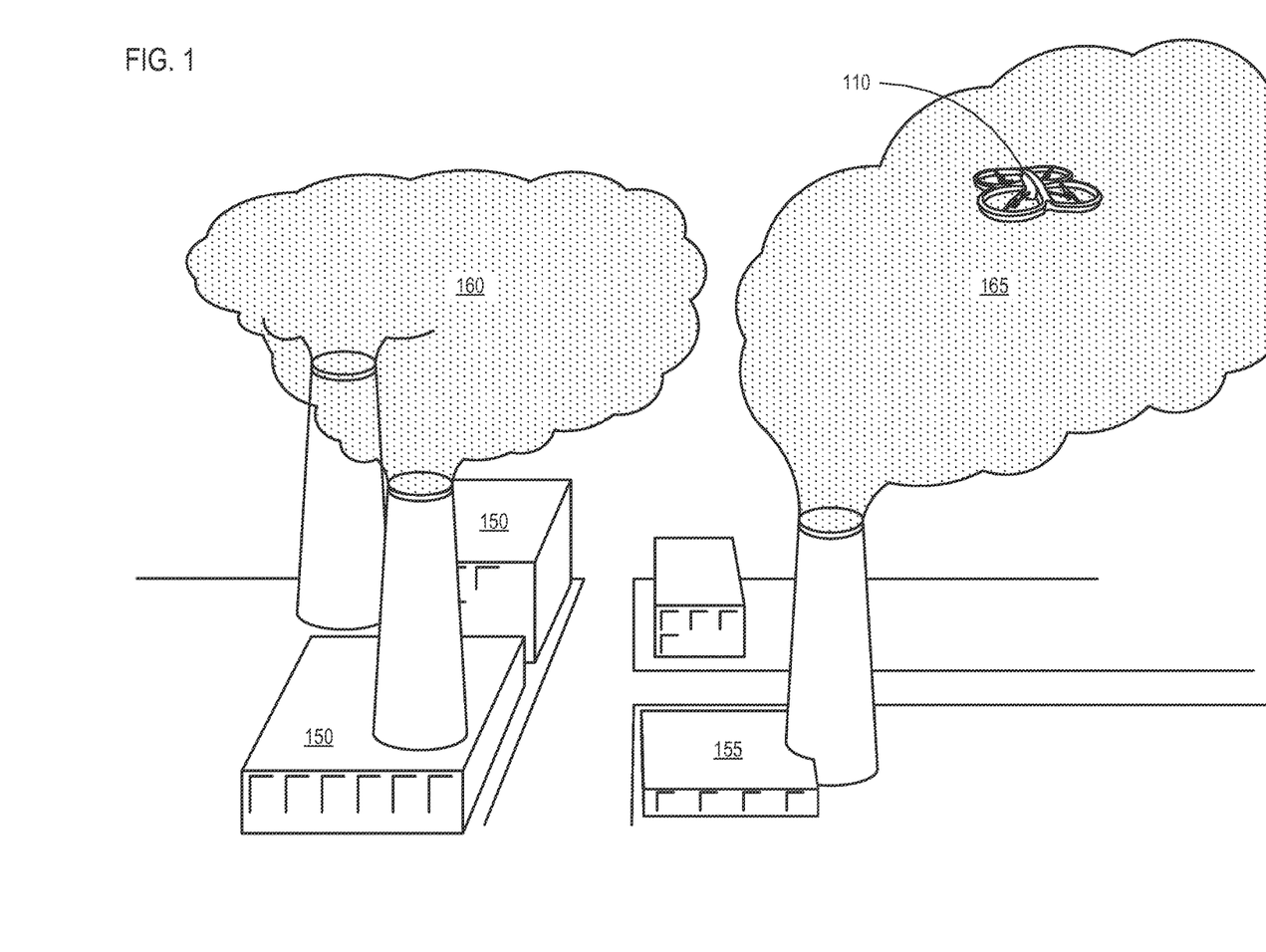
FIG. 1 is a perspective view of an unmanned aerial vehicle configured to mark airborne materials in plumes.

FIG. 1 is a perspective view of an unmanned aerial vehicle 110 configured to mark airborne materials in plumes 160. For example, one or more sources 150 may emit plumes of airborne material 160. The one or more sources 150 may include factories, power plants, vehicles, crop fields, and/or the like. The unmanned aerial vehicle 110 may be configured to detect a substance of interest in a plume 165 and/or to detect the plume 165 itself. In some embodiments, the unmanned aerial vehicle 110 may initially detect the plume 165 and may then determine whether the plume 165 contains a substance of interest.

The unmanned aerial vehicle 110 may determine a gradient of increasing concentration of the substance of interest and travel up the gradient of increasing concentration to reach a source 155 of the plume 165 and/or to reach a location where the concentration of the substance of interest is above a predetermined threshold. In the illustrated embodiment, the unmanned aerial vehicle 110 includes a sensor (not shown) that requires the unmanned aerial vehicle 110 to be in the plume to detect the substance of interest (e.g., a mass spectrometer, a chemical sensor, etc.). In alternate embodiments, the unmanned aerial vehicle 110 may include a sensor able to detect the substance of interest from near the plume (e.g., an optical spectrometer, an image sensor, etc.).

Figure 2:
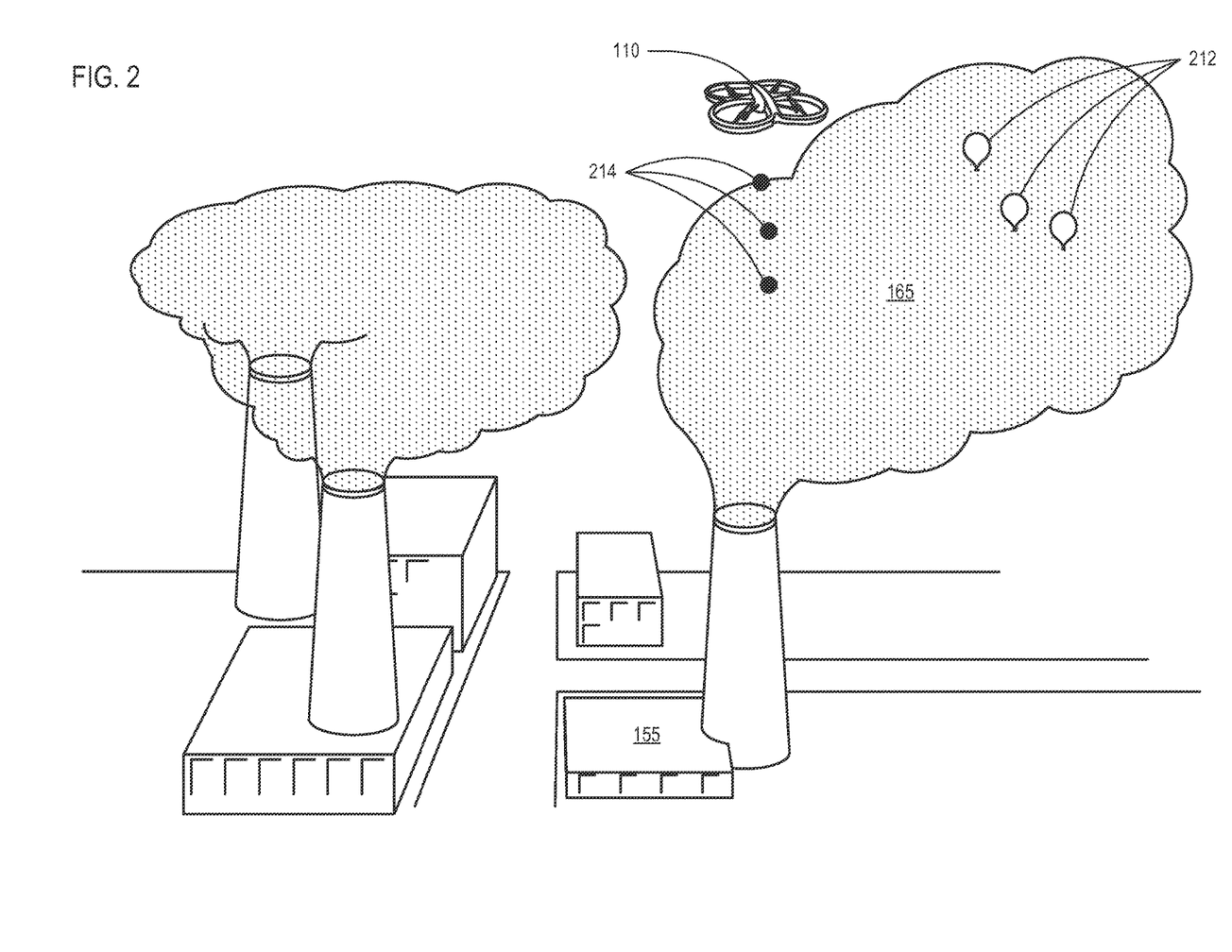
FIG. 2 is a perspective view of an unmanned aerial vehicle that has released tracer materials into a plume of interest.

FIG. 2 is a perspective view of an unmanned aerial vehicle 110 that has released tracer materials 212, 214 into a plume of interest 165. The unmanned aerial vehicle 110 may release the tracer materials 212, 214 into the plume 165 in response to detecting a substance of interest, in response to detecting a concentration of a substance of interest above a predetermined threshold, in response to determining a source of the substance of interest has likely been reached, in response to receiving an indication to dispense the tracer materials 212, 214, and/or the like. For example, the unmanned aerial vehicle 110 may have detected the plume 165, may have determined that the plume 165 included a substance of interest, and may have traveled up the plume 165 to a source. Then, the unmanned aerial vehicle 110 may have positioned itself and dispensed the tracer materials 212, 214 so that the tracer materials 212, 214 entered the plume. After dispensing the tracer materials 212, 214, the unmanned aerial vehicle 110 may fly a predetermined distance from the plume 165, the substance of interest, and/or the tracer materials 212, 214.

The tracer materials 212, 214 may include macroscopic material 212, such as mini-balloons, configured to float in the plume 165 (e.g., the macroscopic material 212 may be configured to be approximately neutrally buoyant in the plume 165). The tracer materials may also include microscopic materials 214 configured to react or interact with the substance of interest or configured to float in the plume 165. In the illustrated embodiment, the unmanned aerial vehicle 110 has released both macroscopic material 212 and microscopic material 214. In alternate embodiments, the unmanned aerial vehicle 110 may only carry macroscopic material 212, may only carry microscopic material 214, and/or may determine that one of the macroscopic material 212 and the microscopic material 214 should be released. For example, the unmanned aerial vehicle 110 may initially release macroscopic material 212 to mark the plume 165. A predetermined distance from the source 155, the unmanned aerial vehicle 110 may also release microscopic material 214 to react and/or interact with the substance of interest (e.g., to determine a concentration of the substance of interest at the predetermined distance). In some embodiments, the tracer materials 212, 214 may be selected based on the substance of interest.

Figure 3:
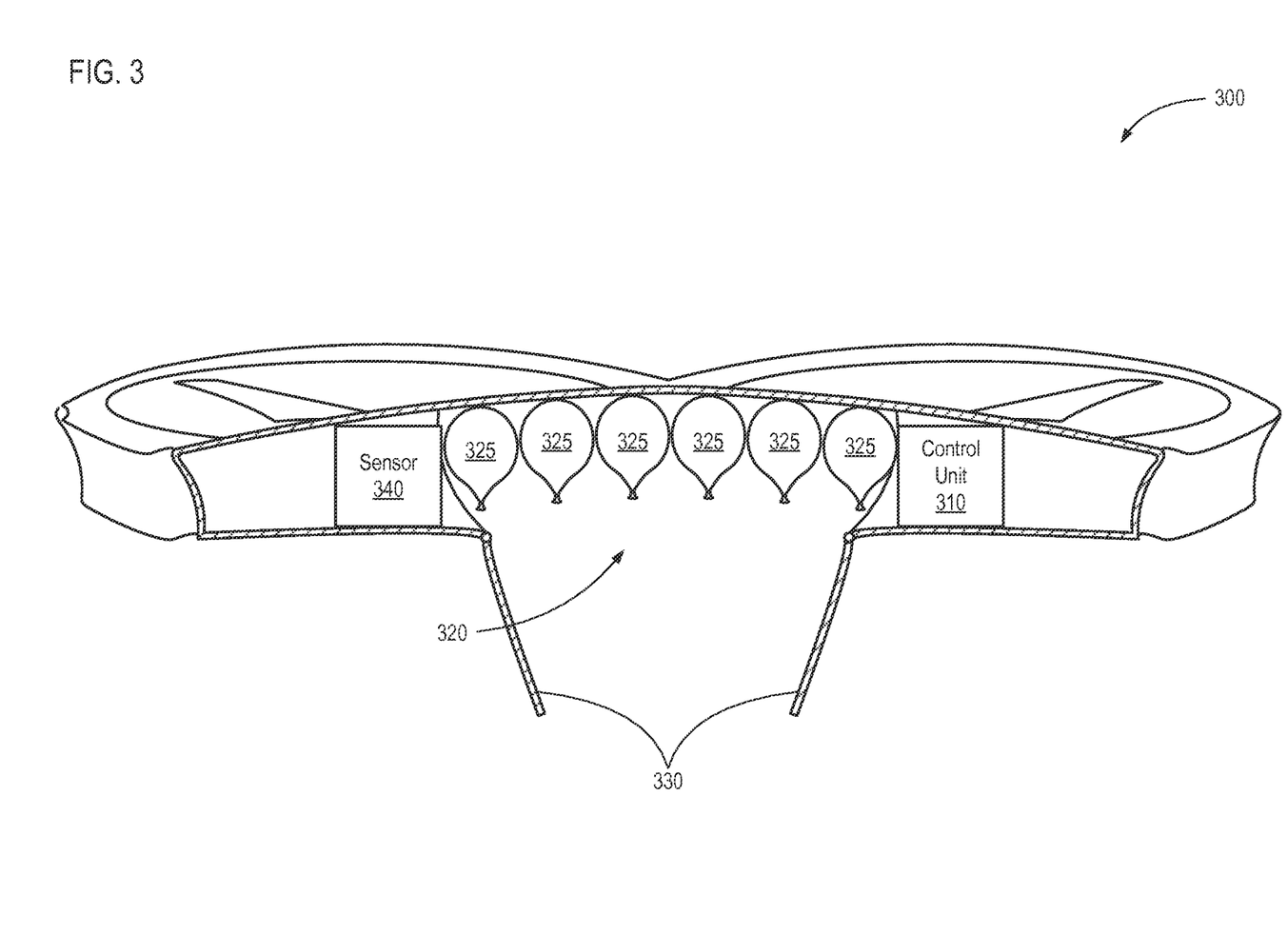
FIG. 3 is a schematic diagram of an unmanned aerial vehicle configured to mark airborne material.

FIG. 3 is a schematic diagram of an unmanned aerial vehicle 300 configured to mark airborne material. The unmanned aerial vehicle 300 may include a control unit 310. The control unit 310 may be configured to instruct a tracer dispenser 330 to eject tracer material. The control unit 310 may also, or instead, be configured to pilot the unmanned aerial vehicle 300. Alternatively, or in addition, the control unit 310 may be configured to receive instructions, and the control unit 310 may instruct the tracer dispenser 330 to eject tracer material and/or may pilot the unmanned aerial vehicle 300 based on the received instructions. For example, the unmanned aerial vehicle 300 may include a transceiver configured to receive instructions from a remote human pilot and/or automatic pilot. The remote human pilot and/or automatic pilot may determine when to eject the tracer material and/or may pilot the unmanned aerial vehicle.

The unmanned aerial vehicle 300 may include a sensor 340. The sensor 340 may be configured to detect a substance of interest and/or a plume. The sensor 340 may be configured to determine a gradient of increasing concentration of a substance of interest. Alternatively, or in addition, the control unit 310 may be able to determine a gradient of increasing concentration of a substance of interest based on a plurality of measurements by the sensor 340. The sensor 340 may include an image sensor, a chemical sensor, a mass spectrometer, an optical spectrometer, and/or the like. The sensor 340 may be configured to detect a substance of interest. For example, the sensor 340 may be designed for detecting a particular substance and/or may be able to detect a dynamically selected substance of interest.

The unmanned aerial vehicle 300 may include a storage area 320. The storage area 320 may be configured to hold tracer material 325 until the unmanned aerial vehicle 300 is ready to dispense the tracer material 325. In the illustrated embodiment, the storage area 320 includes a storage bay which contains a macroscopic material. For example, the storage area 320 may contain previously inflated mini-balloons. In alternate embodiments, the storage area 320 may hold uninflated mini-balloons, which may be inflated before or during dispensing.

The unmanned aerial vehicle 300 may include a tracer dispenser 330 configured to eject the tracer material 325. In the illustrated embodiment, the tracer dispenser 330 may include doors that seal the storage area 320 when closed. The doors may open to release the tracer material 325. The tracer dispenser 330 may be communicatively coupled to the control unit 310, which may control ejection of the tracer material 325 (e.g., opening and closing of the doors). In some embodiments, the control unit 310 may be programmed to pilot the unmanned aerial vehicle 300 a predetermined distance from a plume into which the tracer material 325 will be released. The distance may be predetermined based on the aerodynamic properties of the tracer material 325, and/or the distance may be dynamically determined based on the motion of the tracer material 325 after it is released.

Figure 4:
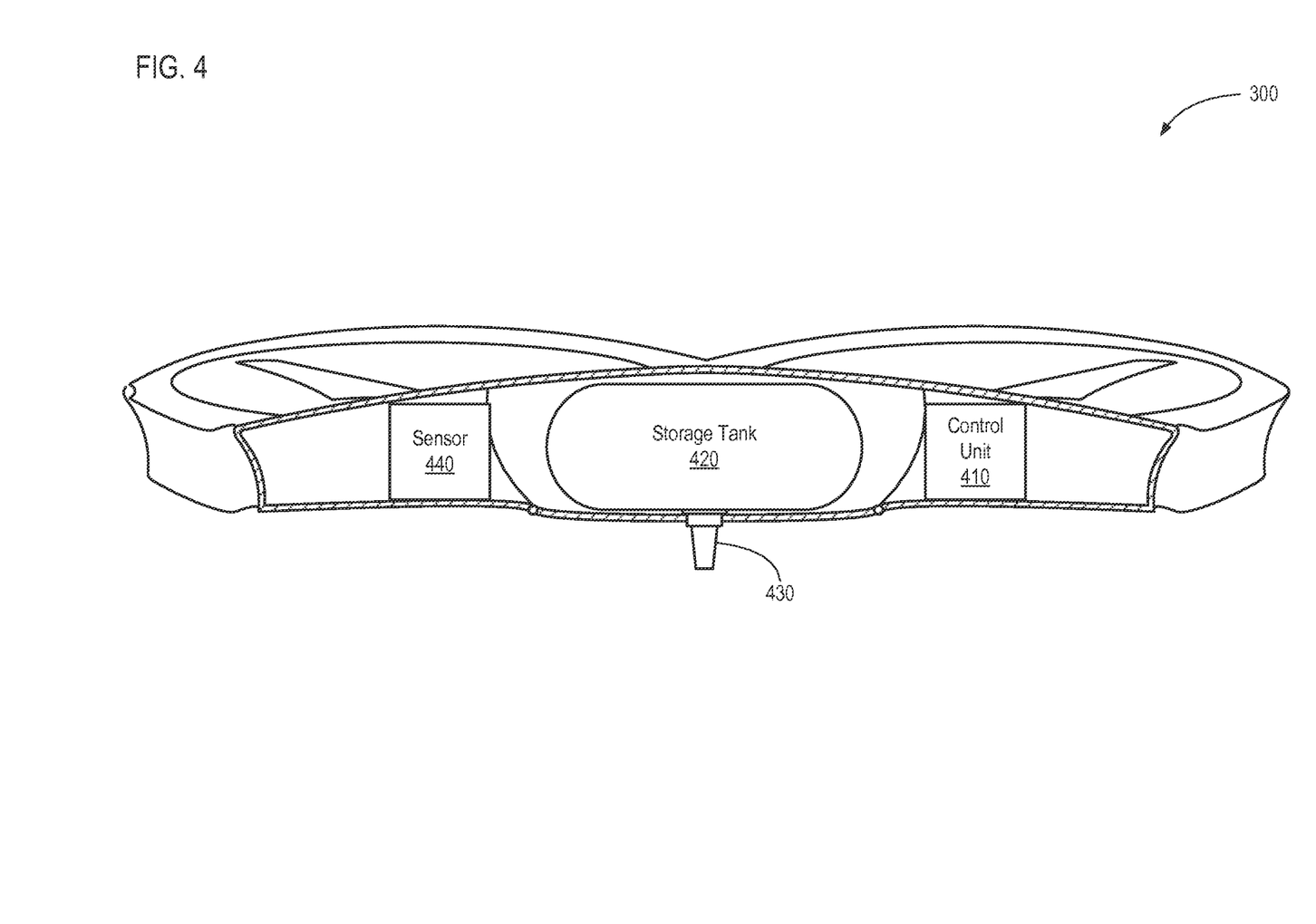
FIG. 4 is a schematic diagram of an unmanned aerial vehicle configured to mark airborne materials.

FIG. 4 is a schematic diagram of an unmanned aerial vehicle 400 configured to mark airborne materials. The unmanned aerial vehicle 400 may be configured to store a microscopic tracer material. For example, the unmanned aerial vehicle 400 may include a storage tank 420 rather than a storage bay. The storage tank 420 may be designed to prevent leaking of or corrosion from the microscopic material. For example, the storage tank 420 may be designed for storage of a particular tracer material and/or may be designed for storage of any of or multiple of a plurality of different tracer materials.

The unmanned aerial vehicle 400 may include a nozzle 430 as a tracer dispenser. The nozzle 430 may be coupled to the storage tank 420 and configured to eject the contents of the storage tank 420 when instructed to do so, for example, by a control unit 410. In an embodiment, the storage tank 420 may store contents under pressure and the nozzle 430 may include a valve configured to receive signals to open or close from the control unit 410. The size of the nozzle 430 (e.g., an orifice diameter) may be selected based on the tracer material to be released. Alternatively, or in addition, the nozzle 430 may be sized for any of or multiple of a plurality of different tracer materials.

The unmanned aerial vehicle 400 may include a sensor 440 similar to the sensor 340. The sensor 440 may be configured to detect a substance of interest. In some embodiments, the sensor 440 and/or the control unit 410 may be configured to determine a gradient of increasing concentration of the substance of interest. Once the substance of interest has been detected by the sensor 440, a concentration of the substance of interest above a predetermined threshold has been detected by the sensor 440, the unmanned aerial vehicle 400 has been piloted up the gradient of increasing concentration, or the like, the control unit 410 may determine that the tracer material should be ejected into the plume. The control unit 410 may pilot the unmanned aerial vehicle 400 a predetermined and/or dynamically determined distance from the plume while the tracer material is ejected. The distance may be selected so that the tracer material enters the plume and remains within it.

Figure 5:
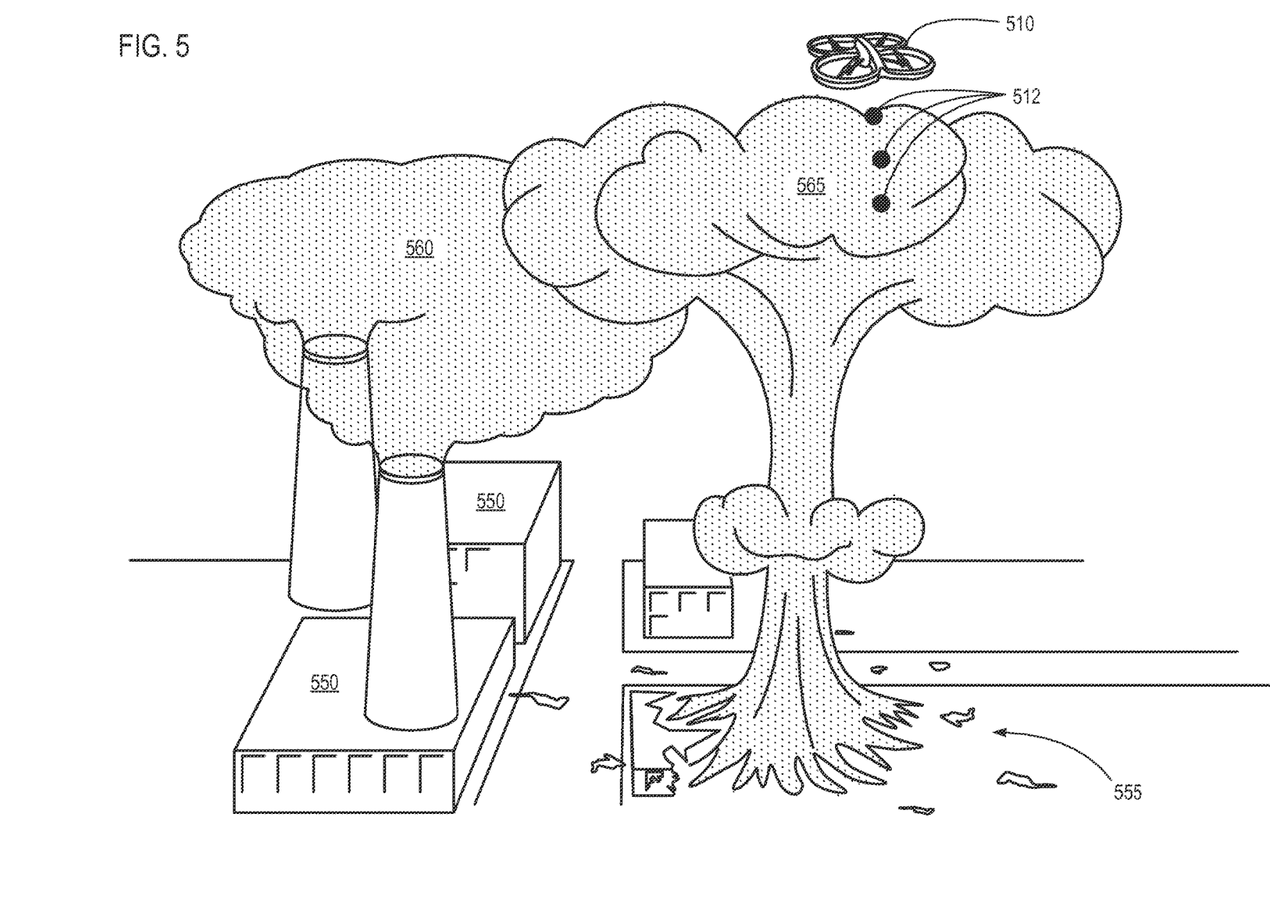
FIG. 5 is a perspective view of an unmanned aerial vehicle configured to mark airborne material in a plume.

FIG. 5 is a perspective view of an unmanned aerial vehicle 510 configured to mark airborne material in a plume 565. In the illustrated embodiment, the plume 565 may be the result of an explosion 555. Accordingly, the plume 565 may include explosive-related compounds, radioactive substances, biological hazards, toxic chemicals, and/or the like. The unmanned aerial vehicle 510 may be able to detect the plume 565 and distinguish it from plumes 560 from other sources 550. For example, the unmanned aerial vehicle 510 may be able to detect the explosive-related compounds, radioactive substances, biological hazards, toxic chemicals, and/or the like to identify the plume 565.

Explosions may be finite sources of plumes and airborne materials rather than continuous sources. For finite sources, the plume 565 may stop being produced before the unmanned aerial vehicle 510 is able to reach the source. Accordingly, the unmanned aerial vehicle 510 may not attempt to climb a gradient of increasing concentration and/or may do so for only a limited amount of time. For a finite plume 565, especially one containing a very hazardous substance of interest, the unmanned aerial vehicle 510 may attempt to eject the tracer material 512 into as much of the plume as possible so that as much as the plume as possible can be traced. For example, the unmanned aerial vehicle 510 may attempt to detect the contours of the plume 565 (e.g., using a sensor) and thereby determine where to eject the tracer material 512.

Figure 6:
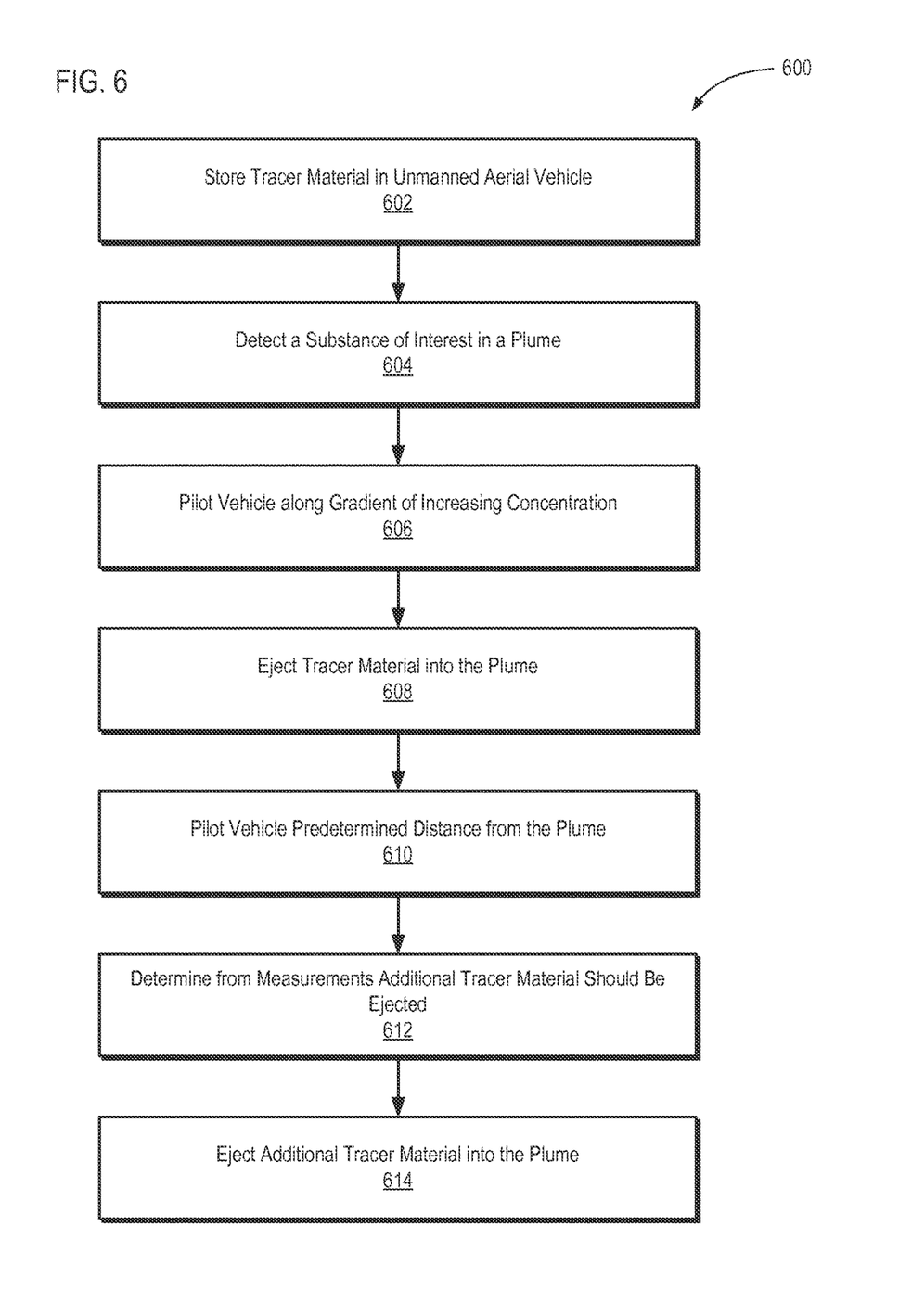
FIG. 6 is a flow diagram of a method for marking airborne material in a plume using an unmanned aerial vehicle.

FIG. 6 is a flow diagram of a method 600 for marking airborne material in a plume using an unmanned aerial vehicle. The method 600 may begin with storing 602 tracer material in an unmanned aerial vehicle. For example, macroscopic tracer material, microscopic tracer material, and/or the like may be stored in the unmanned aerial vehicle. The tracer material may be stored 602 by storing a container holding the tracer material and/or by loading the tracer material directly into the unmanned aerial vehicle.

A substance of interest may be detected 604 in a plume. The substance of interest may be detected 604 by performing measurements using a sensor. The sensor may be configured to detect a particular substance of interest and/or that the substance of interest is of a particular type (e.g., emits radiation, belongs to a particular class of compounds, etc.). Alternatively, the plume itself may be detected, for example, using a sensor. In some embodiments, the unmanned aerial vehicle may be piloted 606 along a gradient of increasing concentration of the substance of interest. For example, the gradient of increasing concentration may be measured and/or computed from measurements. The unmanned aerial vehicle may be piloted to a source, for a predetermined time, until a predetermined concentration of the substance of interest is reached, and/or the like.

Tracer material may be ejected 608 into the plume. The tracer material may be ejected 608 once predetermined criteria have been satisfied. For example, the tracer material may be ejected once the unmanned aerial vehicle has finished piloting up the gradient, once the substance of interest has been detected, and/or the like. The manner of ejecting the tracer material may depend on the particular tracer material to be ejected. For example, in some embodiments, microscopic material may be ejected using a nozzle. Macroscopic and/or microscopic material may be ejected by opening doors enclosing the tracer material. The unmanned aerial vehicle may be piloted a predetermined distance from the plume while the tracer material is being ejected 608. For example, the predetermined distance may be selected to maximize the probability that the ejected tracer material enters and remains in the plume.

After the tracer material has been ejected into the plume, the unmanned aerial vehicle may be piloted 610 a predetermined distance from the plume. For example, the predetermined distance may be selected so that the unmanned aerial vehicle does not disturb the plume, the substance of interest, the tracer material, and/or the like. The position of the unmanned aerial vehicle may also or instead be selected to prevent disruption to the plume, the substance of interest, the tracer material, etc.

In some embodiments, measurements of the plume, the substance of interest, the tracer material, and/or the like may be performed by the unmanned aerial vehicle and/or by a remote monitoring site or vehicle. Based on the measurements, it may be determined 612 that additional tracer material should be ejected. For example, it may be determined that the previously released tracer material has separated from the plume, that the concentration of the substance of interest has changed (e.g., a higher concentration has been detected), that the plume has changed direction or shape and/or the like. The additional tracer material may then be ejected 614 into the plume. For example, the unmanned aerial vehicle may be piloted a predetermined distance from the plume and/or to a selected location, and the additional tracer material may be ejected 614. The additional tracer material may be the same as or different from the tracer material previously ejected 608. In some embodiments, different tracer materials may be used for different purposes and/or for tracking different airborne materials. The previously ejected tracer material and/or additional tracer material may be selected accordingly. Elements of the method 600 may be rearranged and/or omitted in some embodiments as would be apparent to those of skill in the art. For example, piloting 606 the vehicle along the gradient of increasing concentration, piloting 610 a predetermined distance from the plume, determining 612 additional tracer material should be ejected, ejecting 614 the additional tracer material, and/or other elements may be omitted in some embodiments.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An unmanned aerial vehicle for marking airborne materials in a plume, the vehicle comprising:
   a sensor that detects a substance of interest within the plume;
   a tracer storage unit that holds a plurality of different tracer materials;
   a tracer dispenser that ejects a selected one of the plurality of different tracer materials into the plume, wherein one or more properties of the selected tracer material change in response to the substance of interest within the plume; and
   a control unit that instructs the tracer dispenser to eject the selected one of the plurality of different tracer materials in response to detecting the substance of interest within the plume as the unmanned aerial vehicle flies by the plume, wherein ejection of the selected one of the plurality of different tracer materials is based on the detected substance of interest within the plume.

2. The vehicle of claim 1, wherein the selected tracer material comprises a fluorescent material.

3. The vehicle of claim 2, wherein the selected tracer material comprises a fluorescent nanocrystal.

4. The vehicle of claim 1, wherein the selected tracer material comprises a smart dust.

5. The vehicle of claim 1, wherein the selected tracer material comprises an aerogel.

6. The vehicle of claim 1, wherein the selected tracer material comprises sulfur hexafluoride.

7. The vehicle of claim 1, wherein the substance of interest comprises at least one of a pollutant, an explosive-related compound, a radioactive substance, a biological hazard, and a toxic chemical.

8. The vehicle of claim 1, wherein the control unit instructs the tracer dispenser to eject the selected tracer material into the plume in response to detecting a concentration of the substance of interest above a predetermined threshold.

9. The vehicle of claim 1, wherein the sensor detects a biological hazard.

10. The vehicle of claim 1, wherein the sensor detects a toxic chemical.

11. The vehicle of claim 1, wherein the sensor comprises a spectrometer.

12. The vehicle of claim 1, wherein the control unit instructs the tracer dispenser to eject additional selected tracer material.

13. The vehicle of claim 12, further comprising a transceiver that receives an indication that additional selected tracer material should be ejected, wherein the control unit instructs the tracer dispenser to eject the additional selected tracer material in response to the indication.

14. The vehicle of claim 1, wherein the control unit pilots the vehicle a predetermined distance from the selected tracer material after instructing the tracer dispenser to eject the tracer material.

15. The vehicle of claim 14, wherein the predetermined distance is selected to prevent disruption with at least one of a natural motion of the selected tracer material or the plume.

16. The vehicle of claim 1, wherein the vehicle is selected from the group consisting of an unpiloted aerial vehicle and a remotely piloted aerial vehicle.

17. The vehicle of claim 1, wherein the sensor includes at least one of an image sensor, chemical sensor, mass spectrometer, or optical spectrometer.

18. The vehicle of claim 1, wherein the control unit further:
   detects a gradient of increasing concentration of the substance of interest within the plume; and
   instructs the vehicle to travel along the gradient of increasing concentration of the substance of interest within the plume prior to instructing the tracer dispenser to eject the selected tracer material.

19. The vehicle of claim 18, wherein the instructions to the vehicle to fly along the gradient of increasing concentration of the substance of interest within the plume directs the vehicle to a likely source of the substance of interest within the plume.

20. The vehicle of claim 1, wherein the one or more properties of the selected tracer material that change in response to the substance of interest within the plume include at least one of color, conductivity, or light scattering properties.

21. The vehicle of claim 1, wherein the one or more properties of the selected tracer material changing in response to the substance of interest within the plume occur without the selected tracer material reacting to the substance of interest within the plume, the reaction including chemical reactions or absorption with respect to the substance of interest.

22. A method for marking airborne materials in a plume, the method comprising:
   storing a plurality of different tracer materials in an unmanned aerial vehicle; wherein the vehicle comprising a sensor; a tracer storage unit that holds the plurality of different tracer materials; a tracer dispenser, and a control unit;
   detecting a substance of interest within the plume;
   ejecting a selected one of the plurality of tracer materials into the plume, wherein one or more properties of the selected tracer material change in response to the substance of interest within the plume;
   instructing the tracer dispenser to eject the selected one of the plurality of the tracer materials in response to detecting the substance of interest within the plume as the unmanned aerial vehicle flies by the plume, wherein ejection of the selected one of the plurality of tracer materials is based on the detected substance of interest within the plume.

23. The method of claim 22, wherein the selected tracer material comprises a fluorescent material.

24. The method of claim 23, wherein the selected tracer material comprises a fluorescent nanocrystal.

25. The method of claim 22, wherein the selected tracer material comprises a smart dust.

26. The method of claim 22, wherein the selected tracer material comprises an aerogel.

27. The method of claim 22, wherein the selected tracer material comprises sulfur hexafluoride.

28. The method of claim 22, wherein detecting the substance of interest comprises detecting at least one of a pollutant, an explosive-related compound, a radioactive substance, a biological hazard, and a toxic chemical.

29. The method of claim 22, wherein ejecting the selected tracer material comprises ejecting the selected tracer material into the plume in response to detecting a concentration of the substance of interest above a predetermined threshold.

30. The method of claim 22, wherein detecting the substance of interest comprises detecting a toxic chemical.

31. The method of claim 22, wherein detecting the substance of interest comprises detecting the substance of interest with a spectrometer.

32. The method of claim 22, wherein detecting the substance of interest comprises illuminating the substance of interest with a laser illuminator.

33. The method of claim 22, further comprising causing the unmanned aerial vehicle to eject additional selected tracer material.

34. The method of claim 33, further comprising receiving an indication that additional selected tracer material should be ejected, wherein ejecting the additional selected tracer material further comprises ejecting the additional selected tracer material in response to the indication.

35. The method of claim 22, further comprising piloting the vehicle a predetermined distance from the selected tracer material after ejecting the selected tracer material.

36. The method of claim 35, wherein the predetermined distance is selected to prevent disruption to a natural motion of at least one of the selected tracer material or the plume.

37. The method of claim 22, wherein the unmanned aerial vehicle is selected from the group consisting of an unpiloted aerial vehicle and a remotely piloted aerial vehicle.

\* \* \* \* \*